Nov. 22, 1955    J. L. GRATZMULLER    2,724,412
HYDROPNEUMATIC ACCUMULATOR
Filed Sept. 19, 1951    2 Sheets-Sheet 1
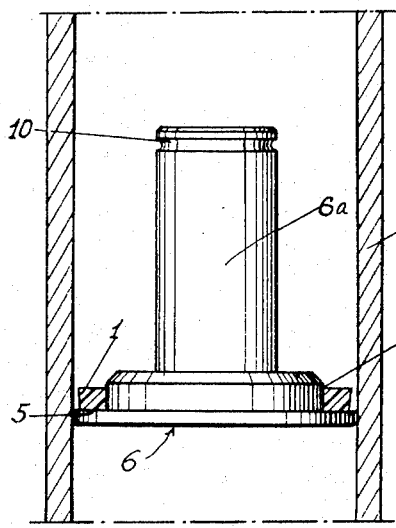
Fig. 2
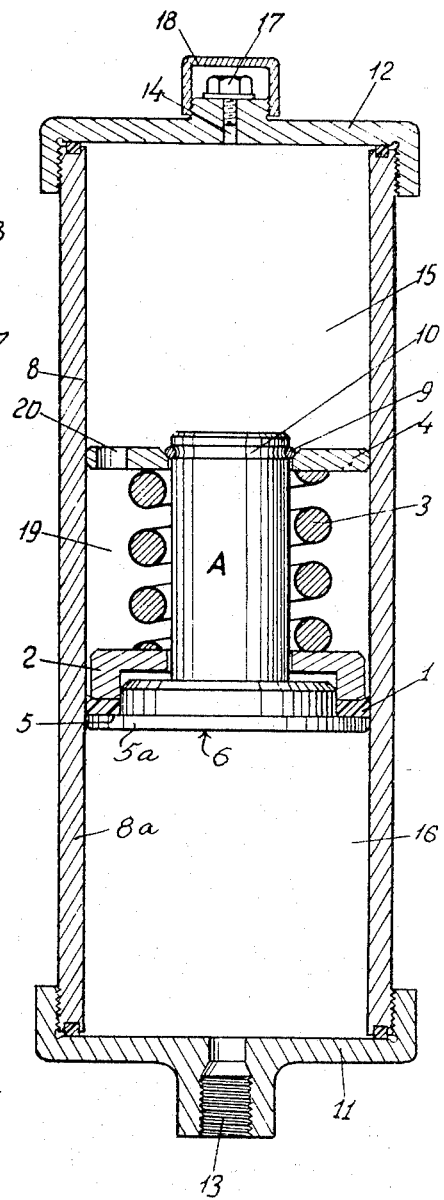
Fig. 1
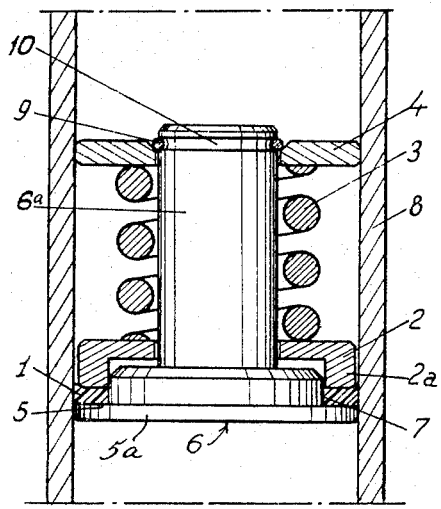
Fig. 2ª
Inventor:
Jean Louis Gratzmuller
By Brown & Leonard
Attorneys

United States Patent Office 2,724,412
Patented Nov. 22, 1955

2,724,412

HYDROPNEUMATIC ACCUMULATOR

Jean Louis Gratzmuller, Paris, France

Application September 19, 1951, Serial No. 247,226

Claims priority, application France September 23, 1950

5 Claims. (Cl. 138—31)

This invention relates to hydropneumatic accumulators and, more particularly, to air and oil accumulators of the type in which the two fluids contained within the cylindrical body of the accumulator are separated from one another by a free piston.

In this type of accumulator, the tightness between the aforesaid piston and cylindrical body is difficult to obtain.

One object of the invention is to provide the free piston of an accumulator of the aforesaid type with a simple, cheap and efficient packing device essentially comprising a sealing ring confined in the periphery of the piston and receiving, from a spring, such an axial pressure as to be deformed and applied against the cylinder with a sufficient radial pressure to ensure the desired tightness.

The cross-section of the sealing ring, as well as the material it is made of, may be chosen according to conditions and temperatures of working, the nature of the fluids, etc.

Another object of the invention is, however, to use an O-ring so as to minimize the cost of the device, such O-rings being standard and manufactured on a large scale.

Still another object of the invention is to use a sealing ring made of a plastic or elastic material such as neoprene, "Perbunan" (copolymer of butadiene and acrylonitrile), silicone resins or polyamides.

These plastic materials have the remarkable property of assuming a slow plastic deformation under the action of a continuous force, so that, when subjected to the action of the aforesaid spring, they ensure, in any possible conditions of use, a perfect tightness. As a sealing ring made of such a material wears down, after long continued use, the above mentioned continuous force causes additional deformations capable of ensuring the required tightness in spite of said wearing. Moreover, if the accumulator is subjected to very low temperatures capable of causing a contraction of the sealing ring, the action of the spring re-establishes automatically the desired tightness.

This has been confirmed by trials made at —80° C.

Now, the friction of the piston on the cylinder determines a small pressure difference between the two fluids.

A further object of the invention is to provide the above mentioned accumulator with a packing device of the type described, the spring of which is so calibrated that the radial pressure with which the sealing ring is applied against the cylinder is materially higher than said pressure difference.

Since the friction between the metal parts is practically negligible, the total friction mentioned above may be considered as equal to that which takes place between the sealing ring and the cylinder wall.

Let R be the inner radius of cylinder 8 (see Fig. 1a);
r, the outer radius of the smaller diameter portion 7 of piston A;
F, the friction force of the sealing ring 1 on cylinder 8;
b, the axial width of the area on which the sealing ring 1 is applied on cylinder 8;
$p_r$, the radial pressure with which the sealing ring 1 is applied on the wall of cylinder 8;
p, the fluid pressure on one side of the piston;
$p+dp$, the fluid pressure on the other side of the piston.

The piston is moved in the cylinder under the action of the difference between the pressures acting upon its faces. The driving force is equal to the pressure difference $dp$ multiplied by the area of the cylindrical bore $\pi R^2$; said driving force is counteracted by the friction resistance of the sealing ring on the cylinder which is equal to pressure $p_r$ multiplied by the area of the contact surface between said ring and cylinder $2\pi R b$ and by the coefficient of friction $k$.

This may be written:

$$F = dp\pi R^2 = P_r 2\pi R b k$$

The tightness will be ensured if condition $p_r > dp$ is met.

This will take place when $\pi R^2 > 2\pi R b k$, i. e.

$$k < \frac{R}{2b}$$

Still another object of the invention is to provide the above-mentioned accumulator with a packing device of the type described, the sealing ring of which is applied against the cylinder on an area having such an axial width $b$ that, R being the radius of the cylinder bore and $k$ being the coefficient of friction of said ring on said bore, the condition $$k < \frac{R}{2b}$$

be met.

These and other objects and advantages of the invention will be apparent from the following specification when taken with the accompanying drawings.

In these drawings:

Fig. 1 is an axial longitudinal sectional view of a hydropneumatic accumulator according to the invention.

Fig. 2 is an axial sectional view of the piston of the accumulator shown in Fig. 1, without the elastic means exerting an axial pressure upon the sealing ring and showing the latter before its deformation by said pressure.

Fig. 2a shows the piston of Fig. 2 completed by the seal-compressing ring, the spring applying the latter on the sealing ring and an abutment disk against which bears the other end of the spring.

Figure 3:
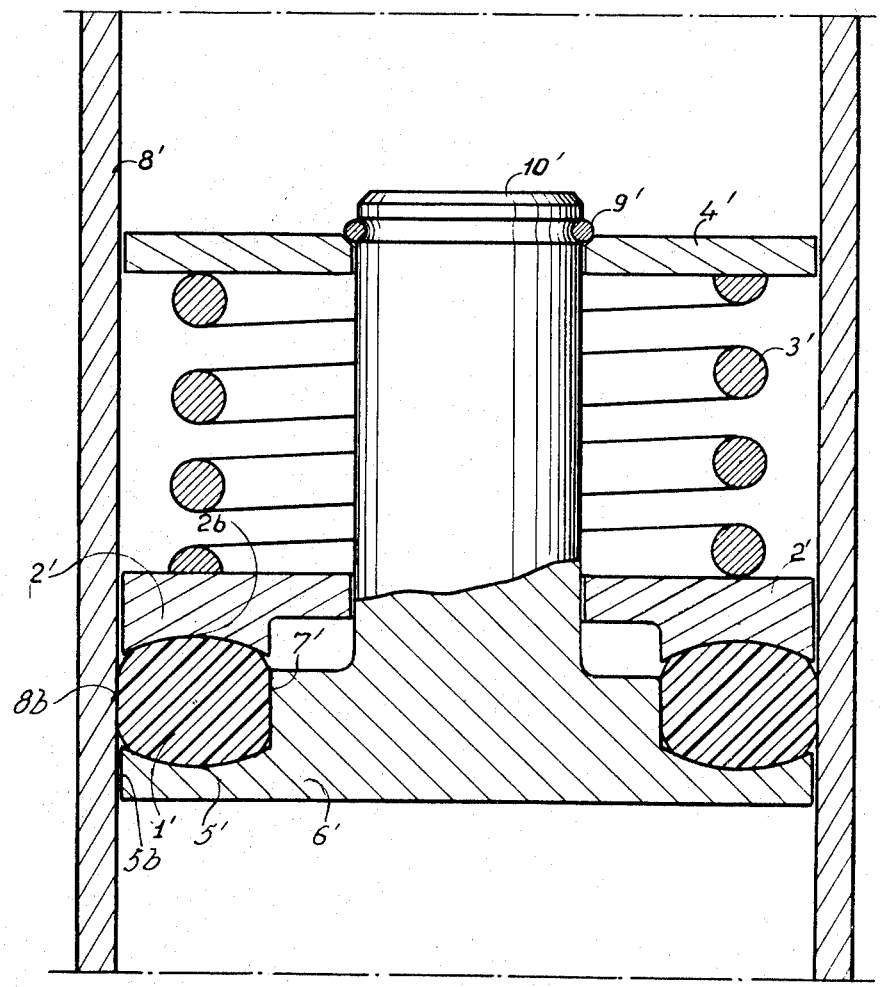
Fig. 3 shows, on a larger scale, a modification of the device of Figs. 1, 2 and 2a in which an O-ring is used.

Referring first to Figs. 1, 2 and 2a, there is shown at 1 a plastic or elastic sealing ring which, in the example shown, has a square cross-section and which is lodged on an annular step 5 formed around the periphery of the disk-shaped element 6 which constitutes the head of the piston. The element 6 is rabbeted to form the step 5 extending radially outward from the cylindrical surface 7 to the concentric cylindrical surface 5a. The diameter of the surface 5a is such as to provide approximately a free sliding fit with the inner wall 8a of cylinder 8, and the surfaces 5, 7 and 8a form an annular open chamber within which rests the sealing ring 1.

In Fig. 2a, the piston is shown assembled. The sealing ring 1 is subjected, as shown, to an axial pressure exerted by a seal-compressing ring 2 which, in the example shown, has the shape of a dished annulus provided with a peripheral rim 2a, the radial thickness of which is slightly smaller than the radial width of the chamber in which the sealing ring is housed. Said seal-compressing member is urged downwards (referring to the figure) by a spring 3 disposed between the upper surface of member 2 and the inner face of an abutment constituted, in the example shown, by an annular disk 4 which is held against outward displacement by a piano wire 9 located in a groove 10 provided at the upper end of the stem 6a of the piston.

With this arrangement, the whole device may be easily and quickly assembled and dismantled. It is clear that, according to the invention, the spring should be so calibrated that, for the different pressures to which both faces of the piston may be simultaneously subjected, the above determined conditions should be met. Under these circumstances, the tightness is perfectly ensured by the radial pressure with which the outer side of the sealing ring is applied against the inner wall of cylinder 8, whatever may be the absolute value of the pressures on either side of the piston.

It will be easily understood that, thanks to the device according to the invention, perfect tightness can be obtained without requiring a high degree of accuracy of the bore by means of a sealing ring of which the dimensions do not require any particular accuracy, the device only comprising a few members which are easy and cheap to manufacture, viz. piston 6—6a, annular disks 2—4 and spring 3, the only critical condition being that the spring must be calibrated as explained above.

In Fig. 1 is shown a complete air and oil accumulator according to the invention.

To provide an efficient accumulator of this type, it is absolutely indispensable to prevent the air, intended to be compressed to store power, from mixing with the oil sent under pressure into the accumulator to compress said air which, when subsequently released, ejects the oil out towards the circuit to be fed.

Due to the very great difficulty of obtaining heretofore a sufficient tightness, one has generally resorted to deformable diaphragms acting as a partition between oil and air or, even, to artificial rubber bladders filled with compressed air and surrounded by the oil which is then contained in the space located between the outer wall of the bladder and the inner wall of the rigid container constituting the body of the accumulator.

The manufacture of such accumulators gives rise to many complex problems. The shape of the bladders and containers, the fixation of the bladders, etc., constitute some of these problems. Moreover, the durability of the bladders is comparatively poor and does not offer a sufficient safety in many applications. Thanks to the present invention, it is now possible to provide a power accumulator constituted by a simple cylindrical tube 8, as shown in Fig. 1, having at both ends heads 11 and 12, one of which, 11, is provided with a port 13 for the oil, and the other of which, 12, is provided with an inflating port 14, the inner space of the tube being tightly subdivided into two compartments 15 and 16, having a variable volume, by a free piston assembly A.

The accumulator of Fig. 1 operates as follows:

Air is first blown in through port 14. Said air drives piston A towards head 11. When the pressure has reached the desired value, e. g. 200 kg./cm.$^2$, port 14 is closed by means of plug 17, the protective cap 18 is screwed on and port 13 is connected to the pressure oil duct system. Piston A moves upwards (referring to Fig. 1) and compresses the air contained in chamber 15 as well as in the inner space 19 of piston A which communicates with chamber 15 through an opening 20 provided in the annular disk 4.

It is to be noted that the whole volume of the space located above the sealing ring 1 is thus used as an air chamber. When the pressure in chamber 16 compensates the pressure in the oil duct system (e. g. 300 kg./cm.$^2$), the accumulator is ready to be used.

It is obvious that the above described accumulator offers many advantages with respect to the known accumulators:

Its manufacture is simple and cheap. It may be assembled and dismantled easily and quickly and does not comprise any delicate part.

It is to be understood that the construction of the cylindrical container constituting the body of the accumulator, the design of the ports provided in the heads of said container and so on, as well as the construction of piston A and the shape of the annular housing of the sealing ring, etc., may be more or less varied within the scope of the invention.

In Fig. 3, the sealing ring 1' which, in this example is an O-ring, bears along two diametrically opposed areas, on the one hand, on the cylindrical wall 7' of piston head 6' and, on the other hand, on the cylindrical wall 8b of cylinder 8'. 5b shows the slightly concave upper face of the annular step provided around the periphery of piston head 6', while 2b is the concave lower face of the seal-compressing ring 2'. Finally, spring 3', as described with reference to Figs. 1, 2 and 2a, exerts upon sealing ring 1', through the seal-compressing ring 2', an axial pressure capable of determining a radial deformation of ring 1', which ensures the required tightness, as previously explained.

While the invention has been described with particular reference to preferred embodiments, it is not intended to limit the scope of the invention to the embodiments illustrated, nor otherwise than by the terms of the subjoined claims.

What is claimed is:

1. A hydropneumatic accumulator comprising a cylinder having a gas inlet port and a liquid port, whereby said accumulator may be charged with gas and liquid, a piston slidably mounted in said cylinder intervening between said ports and defining a gas chamber and a liquid chamber, said piston being constituted by a disk-shaped element, an annular step formed by a rabbet around the periphery of said disk-shaped element, an axial extension on said disk-shaped element, an abutment carried by said extension in a fixed axial relationship to said disk-shaped element, an annular open chamber formed by said annular step and bounded radially by the cylinder wall and by a concentric cylinder surface on the piston, the bottom of said chamber being formed by the annular surface of said step extending from said cylindrical surface toward said cylinder wall, an annular elastically and plastically deformable sealing ring located in said chamber, a seal-compressing ring slidably mounted in said chamber and resting against said sealing ring, and a spring located between said compressing-ring and said abutment to exert on said sealing ring a pressure in excess of that needed to apply said sealing ring against said cylinder wall along an uninterrupted contact surface, said disk-shaped element being submitted exclusively to the action of pressure differences between the fluids acting on its opposed surfaces and directly separated by said sealing ring, whereby said separation of fluids is maintained so long as there is hydraulic fluid under pressure in said cylinder.

2. An accumulator according to claim 1 in which said spring is calculated to exert a compressive force on said sealing ring, in excess of that required to deform the sealing ring sufficiently to ensure contact between it and the cylinder wall along an uninterrupted contact surface, which compressive force materially exceeds the total frictional resistance to movement of the piston divided by the total area of the piston.

3. An accumulator according to claim 1 in which the bottom of said chamber is constituted by a concave annular surface on the disk-shaped element and the lower surface of the sealing ring is constituted by a complementary concave annular surface.

4. An accumulator according to claim 1 in which the abutment is constituted by a part extending radially outward with respect to the axis of the cylinder to points adjacent the cylinder wall, and which includes a stem projecting axially from the disk-shaped element and means for securing said abutment on said stem against axial movement away from the disk-shaped element.

5. An accumulator according to claim 1 in which the sealing ring is of a material capable of slow plastic deformation with time under continuous anisotropic compressive loading, selected from the group consisting of neoprene, "Perbunan" (copolymer of butadiene and acrylonitrile), silicone resins and polymeric amides, characterized by toughness, strength and resistance to abrasion.

References Cited in the file of this patent

UNITED STATES PATENTS

| | | |
|---|---|---|
| 912,502 | Squires | Feb. 16, 1909 |
| 1,056,529 | Fox | Mar. 18, 1913 |
| 1,454,400 | O'Bannon | May 8, 1923 |
| 2,264,413 | Siegerist | Dec. 2, 1941 |
| 2,436,009 | Kremiller | Feb. 17, 1948 |
| 2,440,065 | Ashton | Apr. 20, 1948 |
| 2,619,198 | Freund | Nov. 25, 1952 |

FOREIGN PATENTS

| | | |
|---|---|---|
| 581,268 | Great Britain | Oct. 7, 1946 |
| 989,658 | France | May 30, 1951 |

OTHER REFERENCES

Product Engineering (publication), March 1942.